United States Patent [19]

Janzen, deceased et al.

[11] 4,223,941
[45] Sep. 23, 1980

[54] TRUCK BOX AND COVER ASSEMBLY

[76] Inventors: George Janzen, deceased, late of Winkler, Manitoba, Canada, by Susan Janzen, administratrix Box 2080, Winkler, Manitoba, Canada, R0G 2X0

[21] Appl. No.: 951,175

[22] Filed: Oct. 13, 1978

[30] Foreign Application Priority Data

Oct. 18, 1977 [CA] Canada ................................. 288974

[51] Int. Cl.² ............................................... B60P 7/02
[52] U.S. Cl. ................................ 296/100; 105/241.1
[58] Field of Search ............... 296/100, 101, 108, 111, 296/112, 114, 115, , 137 B; 49/41, 40, 366, 370; 105/241 C, 377

[56] References Cited

U.S. PATENT DOCUMENTS

| 2,346,554 | 4/1944 | Clark | 296/100 |
|---|---|---|---|
| 3,503,341 | 3/1970 | Widell et al. | 105/377 |
| 3,511,408 | 5/1970 | Hughes | 296/100 X |
| 3,790,008 | 2/1974 | Joubert | 105/241 C X |
| 3,995,890 | 12/1976 | Fletcher | 296/100 X |

FOREIGN PATENT DOCUMENTS

| 78533 | 6/1962 | France | 296/100 |
|---|---|---|---|
| 288298 | 1/1953 | Switzerland | 296/100 |

*Primary Examiner*—Robert R. Song
*Assistant Examiner*—Norman L. Stack
*Attorney, Agent, or Firm*—Stanley G. Ade

[57] ABSTRACT

A truck box includes a planar base and curved side walls and is enclosed at the ends by a front panel at one end and by a tailgate assembly at the other. A pair of curved clamshell type covers are pivoted to the front panel and are spaced from the outer surface at the rear of the curved side walls, by rollers. Hydraulic jacks at the front open and close the clamshell covers and cable assemblies at each end of each cover guides the movement of the covers. When closed, the truck box is substantially cylindrical and, with the addition of two detachable segments at the rear, is completely sealed. When opened, easy access is provided to the interior. The tailgate assembly preferably includes two side portions which swing outwardly horizontally and a center section which swings outwardly vertically hinging from the top edge of the tailgate assembly.

6 Claims, 12 Drawing Figures

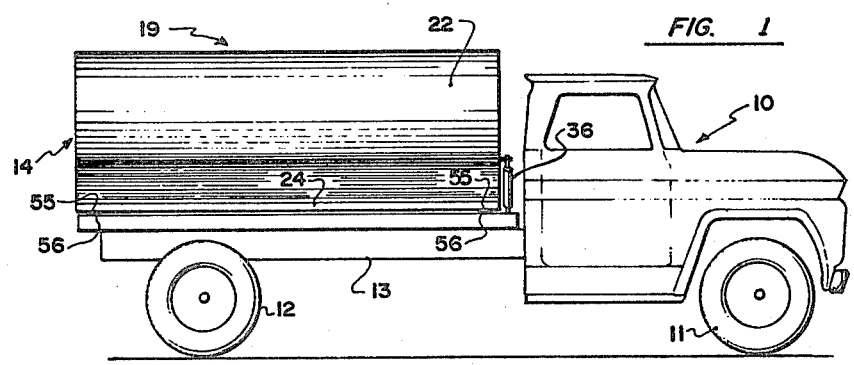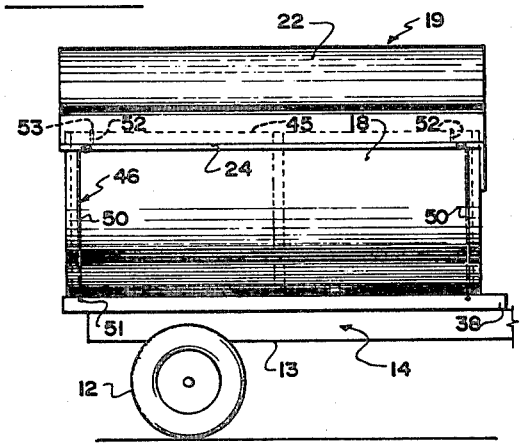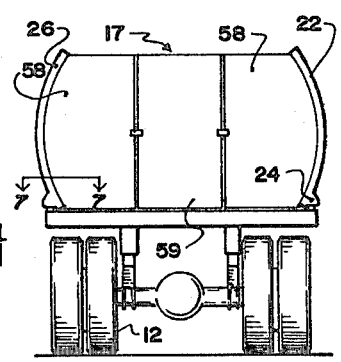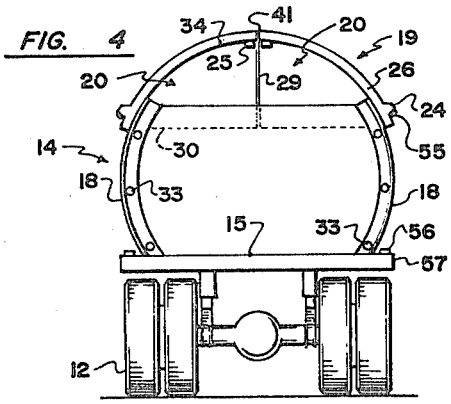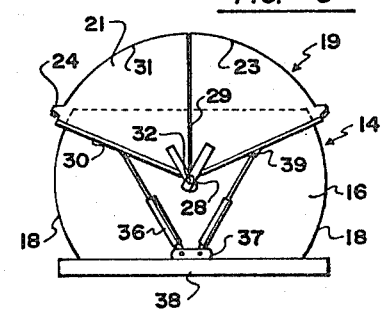

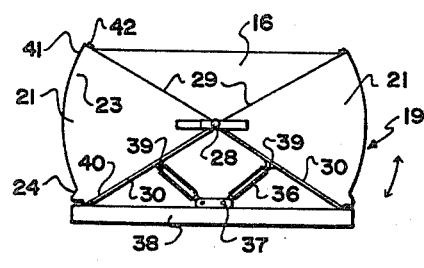
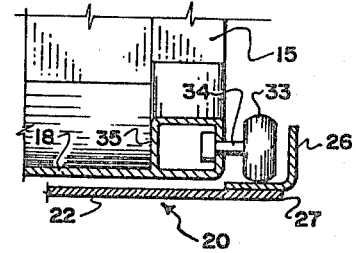
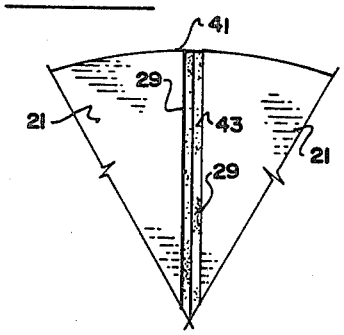
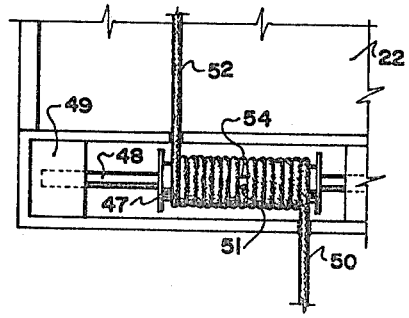
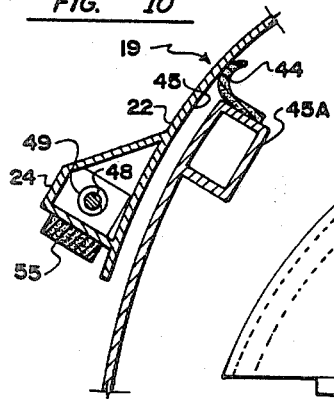
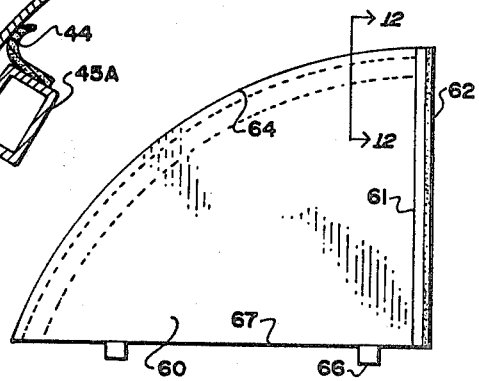
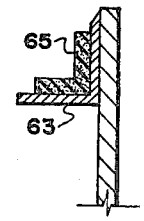

4,223,941

TRUCK BOX AND COVER ASSEMBLY

BACKGROUND OF THE INVENTION

This invention relates to new and useful improvements in truck boxes and covers therefor. Conventionally, open topped truck boxes are closed by a tarpaulin which is either manually positioned or, under certain circumstances, may be mechanically positioned.

However several disadvantages exist with the use of such covers. For example they are difficult to store when not in use and cannot be operated mechanically if the upper boundaries of the load carried by the truck box, extend above the plane of the upper surface of the truck box.

Furthermore it is difficult for tarpaulins and the like to be latched securely in order to avoid damage occurring to the tarpaulin due to wind pressure and the like.

SUMMARY OF THE INVENTION

The present invention overcomes these disadvantages by providing a pair of clamshell like cover panel assemblies which are hinged or supported to the truck box and which can be closed over hydraulically in order to completely enclose and seal the truck box and one aspect of the invention consists of a truck box and cover assembly comprising in combination a planar floor, a front wall, a rear tailgate assembly and curved side walls extending between the side edges of said tailgate assembly and said front wall, a pair of curved cover panel assemblies mounted upon said side walls, means to mount said cover panel assemblies upon said truck box whereby said cover panel assemblies can be moved to an upwardly, closed position thereby substantially enclosing said truck box and to a downwardly open position, said cover panel assemblies lying spaced and parallel from said side panels when in the open position, and means to open and close said cover panel assemblies relative to said truck box.

Another advantage of the present invention includes a tailgate assembly which may be utilized if desired, said tailgate assembly being in several sections which can be removed entirely if desired, for loading and unloading purposes or, alternatively can be opened horizontally insofar as the outer sections are concerned, and horizontally or vertically insofar as the center section is concerned.

Another aspect of the invention is to provide a device of the character herewithin described which, due to the configuration of the side panels of the truck box and of the cover assembly, gives an enclosure greater than that which would be given by a tarpaulin spanning the planar upper surface of the truck box.

Still another aspect of the invention is to provide a device which is simple in construction, economical in manufacture and otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a side elevation of a truck showing the truck box with the cover assembly in the lowered or open position.

FIG. 2 is a fragmentary side view similar to FIG. 1 but showing the cover assemblies in the closed position.

FIG. 3 is a rear elevation of FIG. 1.

FIG. 4 is a rear elevation of FIG. 2.

FIG. 5 is a front elevation of the truck box and cover assembly per se with the cover assembly in the closed position.

FIG. 6 is a view similar to FIG. 5 but showing the cover assembly in the open position.

FIG. 7 is an enlarged fragmentary cross sectional view substantially along the line 7—7 of FIG. 3 and showing the roller mounting support for the rear end of the cover assembly.

FIG. 8 is a fragmentary enlarged end elevation of the upper ends of the cover assemblies in the closed position.

FIG. 9 is a fragmentary enlarged inside view of one of the sheave and cable assemblies within the lower edge of the cover assembly.

FIG. 10 is an enlarged fragmentary cross sectional view showing the seal between the curved cover panel and the upper edge of the truck box side wall.

FIG. 11 is a front elevation of one of the filler panels for the rear truck box cover assemblies.

FIG. 12 is an enlarged fragmentary cross sectional view substantially along the line 12—12 of FIG. 11.

In the drawings like characters of reference indicate corresponding parts in the different figures.

DETAILED DESCRIPTION

Proceeding therefore to describe the invention in detail, reference character 10 illustrates in general, a truck having front wheels 11 and rear wheels 12 together with chassis 13 upon which the truck box collectively designated 14, is mounted conventionally.

The truck box includes a planar floor 15, a front wall 16 and a rear tailgate assembly collectively designated 17.

Extending between the curved side edges of the front wall 16 and the rear tailgate assembly 17 are curved side walls 18.

A cover panel assembly collectively designated 19 consists of a pair of assemblies collectively designated 20 each assembly including a segment shaped front panel 21 and a curved wall panel 22 extending rearwardly from the curved edges 23 of the segments 21.

The curved wall panels 21 are stiffened by a longitudinal lower edge rib assembly 24 and by an upper longitudinal beam 25 together with a curved angle iron tract 26 secured to the rear curved edge 27 of the curved wall panel, the purpose of which will hereinafter be described.

Means are provided to mount these curved cover panel assemblies relative to the side panels 18 of the truck box, said means taking the form of a main front pivot 28 to which the segment shaped front panels are mounted. Each segment shaped front panel includes an upper meeting edge 29 and a lower edge 30 together with the curved edge 31. The curved edge 31 is formed at the junction of the segment shaped front panel and the aforementioned curved wall panel.

The meeting edge 29 and the lower edge 30 diverge from a common locus 32 and these end panels are mounted upon the main pivot 28 adjacent the loci of these segment shaped front panels as shown in FIGS. 5 and 6.

Means are provided to support the rear portions of the curved wall panels so that the curved wall panels are maintained in spaced and parallel relationship from the curved side walls 18 of the truck box during the opening and closing action and reference should be made to FIG. 7 in this regard.

A plurality of rollers 33 are journalled for rotation upon pins 34 extending rearwardly from a support channel member 35 at the rear end of the curved side walls 18 and the aforementioned curved angle iron 26 engages these rollers and acts as a track to support the curved cover panel assemblies relative to the side walls.

Means are provided to open and close the curved cover panel assemblies relative to the truck box, said means taking the form of the fluid operators 36 extending from a mounting bracket 37 secured to a transverse cross member 38 extending from reinforcing panels 40 contiguous with the lower edges 30 of the segment shaped front panels.

These fluid operators are connected to an associated source of hydraulic fluid under pressure within the truck 10 and are adapted to extend and retract thus moving the curved cover panel assemblies from the open position shown in FIG. 6 to the closed position shown in FIG. 5 and vice versa.

The logitudinally extending upper edges 41 of the curved wall panels, are provided with flexible sealing material 42 which meet in sealing relationship when in the closed position and similar sealing material 43 is provided on the meeting edges 29 of the segment shaped front panels 21 so that when in the closed position, these junctions are completely sealed and enclose the truck box.

Reference should also be made to FIG. 10 which shows a longitudinally extending flexible seal 44 secured to the upper reinforcing rib 45 of the truck box side walls which is in wiping and sealing contract with the inner surface 45 of the curved wall panel of the cover panel assemblies.

Means are also provided to guide the cover panel assemblies in the movement thereof from the closed to open position and vice versa, said means taking the form of a cable assembly collectively designated 46 and situated adjacent each end of the cover panel assemblies.

Each cable assembly includes sheaves 47 secured upon a shaft 48 which is journalled for rotation within bearings 49 and the sheaves and shaft 48 together with the bearings are mounted within the longitudinally extending hollow reinforcing rib 24 provided at the lower edge of each cover panel assembly.

A first flexible cable 50 is anchored by the lower end therefor to an anchor point 51 adjacent the base of the truck box and on the side thereof and this cable extends upwardly to the sheave and is wound around the sheave, being anchored to the sheave by the other end thereof as indicated by reference character 51.

A second flexible cable 52 is anchored at one thereof to an anchor point 53 situated adjacent and upper longitudinal edge 45 of the truck box and this cable is also wound around the sheave and is anchored as indicated by reference character 54, to the sheave by the other end thereof.

The direction of winding of cables 50 and 52 is such that as the cover assembly moves upwardly, the first cable unwinds from the sheave and the second cable winds upon the sheave and as the cover assembly is lowered, the reverse action takes place and these cable assemblies guide the cover assemblies during the movement thereof and maintain them in parallel relationship with the truck box.

When in the lowermost position, bumper pads 55 provided on the lower edge of rib 24, rest upon bumper pads 56 situated on longitudinally extending frame members 57 of the truck box as clearly shown in FIGS. 1, 3 and 6.

The rear tailgate assembly 17 is preferably but not necessarily in three portions, a pair of side portions 58 and a central portion 59 with means for opening either the side portions or central portion to provide access to the interior of the truck box. It is desirable that this tailgate assembly 17 also be completely removable if necessary.

Segment shaped panels 60 are provided to fill in the area above the tailgate assembly 17 and the cover panel assemblies when same are in the closed position and are shown in detail in FIGS. 11 and 12. There are two such panels 60, one for the left side and one for the right side and include vertical edges 61 provided with sealing material 62 so that they engage one another.

An angle iron 63 extends around the curved edge 64 and also includes flexible sealing material 65 which engages the curved edge of the cover panel assemblies and seals the junction between the panels 60 and these cover panel assemblies.

Pins 66 on the lower edges 67 of the panels 60, engage apertures (not illustrated) within the upper edge of the tailgate assembly.

It will therefore be seen that cover panel assemblies are provided which can be opened and closed in a clamshell fashion thus enabling the truck box to be completely enclosed and sealed yet providing full access to the interior thereof for loading and unloading purposes.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A truck box and cover assembly comprising in combination a planar floor, a front wall, a rear tailgate assembly and curved side walls extending between the side edges of said tailgate assembly and said front wall, a pair of curved cover panel assemblies mounted upon said side walls, means to mount said cover panel assemblies upon said truck box whereby said cover panel assemblies can be moved to an upwardly, closed position thereby substantially enclosing said truck box and to a downwardly open position, said cover panel assemblies lying spaced and parallel from said side panels when in the open position, and means to open and close said cover panel assemblies relative to said truck box, each of said cover panel assemblies including a segment shaped front panel, and a curved wall panel extending rearwardly from said segment shaped front panel, said segment shaped panel being situated exteriorly of said front wall of said truck box, said segment shaped front panels each including an upper meeting edge and a lower edge diverging from adjacent a common locus, said means to mount said cover panel assemblies upon said truck box including pivotally mounting said cover panel assemblies to said front wall of said truck box by adjacent said common locus of said segment shaped front panels, and roller means operatively connected between the rear end of the curved wall panel of each of said cover panel assemblies and the curved side walls of said truck box adjacent the rear end of said box.

2. The invention according to claim 1 which includes flexible seals between the longitudinally extending upper edges of said curved wall panels of said cover panel assembly, said edges meeting one another in sealing relationship when said cover panel assemblies are in the closed position, an further flexible seals on the meeting edges of said segment shaped front panels, said meeting edges being in sealing relationship when said cover panel assemblies are in the closed position.

3. The invention according to claim 1 in which said means to mount said cover panel assemblies upon said truck box also includes cover panel assembly guiding means including front and rear cable assemblies, each of said cable assemblies including a sheave journalled for rotation adjacent the lower longitudinal edge of said curved wall panel of said curved panel assembly, a first cable anchored by one end thereof to adjacent the base of said curved side wall of said truck box, winding around said sheave and being secured by the upper end thereof to said sheave, and a second cable anchored by one end thereof to adjacent the upper edge of said side wall of said box, winding around said sheave and being anchored to said sheave by the other end thereof, movement of said cover panel assembly winding up said first cable on said sheave and unwinding said second cable from said sheave when said cover panel assembly is lowered and vice versa.

4. The invention according to claim 2 in which said means to mount said cover panel assemblies upon said truck box also includes cover panel assembly guiding means including front and rear cable assemblies, each of said cable assemblies including a sheave journalled for rotation adjacent the lower longitudinal edge of said curved wall panel of said cover panel assembly, a first cable anchored by one end thereof to adjacent the base of said curved side wall of said truck box, winding around said sheave and being secured by the upper end thereof to said sheave, and a second cable anchored by one end thereof to adjacent the upper edge of said side wall of said box, winding around said sheave and being anchored to said sheave by the other end thereof, movement of said cover panel assembly winding up said first cable on said sheave and unwinding said second cable from said sheave when said cover panel assembly is lowered and vice versa.

5. The invention according to claims 1, 2 or 3 in which said means to raise and lower said cover panel assemblies includes a hydraulic jack operatively extending between each of said curved cover panel assemblies and said truck box and being operatively connected to an associated source of hydraulic fluid under pressure.

6. The invention according to claim 4 in which said means to raise and lower said cover panel assemblies includes a fluid operator operatively extending between said segment shaped front panel adjacent the lower edge thereof, and said truck box and being operatively connected to an associated source of hydraulic fluid under pressure.

* * * * *